United States Patent
Shi et al.

(10) Patent No.: US 12,189,662 B1
(45) Date of Patent: Jan. 7, 2025

(54) SYSTEMS AND METHODS FOR FAIRNESS-AWARE DATA DISTILLATION FOR ATTRIBUTE CLASSIFICATION

(71) Applicant: JPMORGAN CHASE BANK, N.A., New York, NY (US)

(72) Inventors: Zhonghao Shi, Los Angeles, CA (US); Hsiang Hsu, Boston, MA (US); Richard Chen, Baldwin Place, NY (US); Wei-Cheng Huang, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/516,519

(22) Filed: Nov. 21, 2023

(51) Int. Cl.
*G06F 16/28* (2019.01)
*G06F 18/2415* (2023.01)

(52) U.S. Cl.
CPC ........ *G06F 16/285* (2019.01); *G06F 18/2415* (2023.01)

(58) Field of Classification Search
CPC .......................... G06F 16/285; G06F 18/2415
See application file for complete search history.

(56) References Cited

U.S. PATENT DOCUMENTS

| | | | |
|---|---|---|---|
| 2024/0177000 A1* | 5/2024 | Galeotti | G06N 3/048 |
| 2024/0256889 A1* | 8/2024 | Su | G06N 3/094 |

OTHER PUBLICATIONS

OpenAI, "Gpt-4 technical report," ArXiv, vol. abs/2303.08774, 2023.
R. Yu, S. Liu, and X. Wang, "Dataset distillation: A comprehensive review," arXiv preprint arXiv:2301.07014, 2023.
N. Mehrabi, F. Morstatter, N. Saxena, K. Lerman, and A. Galstyan, "A survey on bias and fairness in machine learning," ACM computing surveys (CSUR), vol. 54, No. 6, pp. 1-35, 2021.
C.-Y. Chuang and Y. Mroueh, "Fair mixup: Fairness via interpolation," arXiv preprint arXiv:2103.06503, 2021.
W. Su, Y. Yuan, and M. Zhu, "A relationship between the average precision and the area under the roc curve," in Proceedings of the 2015 international conference on the theory of information retrieval, 2015, pp. 349-352.

* cited by examiner

*Primary Examiner* — Cam Y T Truong
(74) *Attorney, Agent, or Firm* — GREENBERG TRAURIG LLP

(57) ABSTRACT

A method may include: receiving an original dataset and a sensitive attribute; initializing a distilled dataset from the original dataset; initializing a classification model; sampling original dataset data and an original dataset label from the original dataset, and distilled dataset data and a distilled dataset label from the distilled dataset; providing the sampled original dataset data from the original dataset to the classification model, resulting in an original dataset prediction probability; providing the sampled distilled dataset data from the distilled dataset to the classification model, resulting in a distilled dataset prediction probability; calculating a distilled dataset cross-entropy loss for the distilled dataset prediction probability and the distilled dataset label; calculating distilled dataset gradients for the distilled dataset cross-entropy loss; calculating a distance between the gradients as a matching loss; and updating the distilled dataset with the matching loss.

20 Claims, 4 Drawing Sheets

SYSTEMS AND METHODS FOR FAIRNESS-AWARE DATA DISTILLATION FOR ATTRIBUTE CLASSIFICATION

BACKGROUND OF THE INVENTION

1. Field of the Invention

Embodiments relate to systems and methods for fairness-aware data distillation for attribute classification.

2. Description of the Related Art

With the exponentially increasing size of machine learning (ML) datasets, data distillation methods aim to efficiently distill useful information from large-scale datasets into smaller datasets, while maintaining the same model performance. Benefits of data distillation include reducing time for model training, exploration, and deployment; becoming less computing-resources hungry; and cutting down carbon footprint for better eco-sustainability.

Large-scale datasets have been shown to tend to include unwanted underlying bias, which may lead to unfair trained models for groups such as gender and ethnicity. Current fairness-blind data distillation methods actually inherit, and may even amplify, any bias from the large-scale dataset.

SUMMARY OF THE INVENTION

Systems and methods for fairness-aware data distillation for attribute classification are disclosed. According to an embodiment, a method for fairness-aware data distillation for attribute classification may include: (1) receiving, by a fairness-aware data distillation computer program, an original dataset and a sensitive attribute; (2) initializing, by the fairness-aware data distillation computer program, a distilled dataset from the original dataset; (3) initializing, by the fairness-aware data distillation computer program, a classification model; (4) sampling, by the fairness-aware data distillation computer program, original dataset data and an original dataset label from the original dataset, and distilled dataset data and a distilled dataset label from the distilled dataset; (5) providing, by the fairness-aware data distillation computer program, the sampled original dataset data from the original dataset to the classification model, resulting in an original dataset prediction probability; (6) providing, by the fairness-aware data distillation computer program, the sampled distilled dataset data from the distilled dataset to the classification model, resulting in a distilled dataset prediction probability; (7) calculating, by the fairness-aware data distillation computer program, a distilled dataset cross-entropy loss for the distilled dataset prediction probability and the distilled dataset label; (8) calculating, by the fairness-aware data distillation computer program, distilled dataset gradients for the distilled dataset cross-entropy loss; (9) calculating, by the fairness-aware data distillation computer program, a distance between the distilled dataset gradients and gradients for an original dataset total loss as a matching loss; and (10) updating, by the fairness-aware data distillation computer program, the distilled dataset with the matching loss.

In one embodiment, the method may also include: calculating, by the fairness-aware data distillation computer program, an original dataset cross-entropy loss for the original dataset prediction probability and the original dataset label; calculating, by the fairness-aware data distillation computer program, a fairness loss for the original dataset data between the distilled dataset prediction probability and the sensitive attribute; calculating, by the fairness-aware data distillation computer program, an original dataset total loss by summing the original dataset cross-entropy loss and the fairness loss; and calculating, by the fairness-aware data distillation computer program, original dataset gradients for the original dataset total loss.

In one embodiment, the method may also include updating, by the fairness-aware data distillation computer program, the classification model with the distilled dataset cross-entropy loss.

In one embodiment, the method may also include recalculating, by the fairness-aware data distillation computer program, a distilled dataset cross-entropy loss before updating the classification model with the distilled dataset cross-entropy loss.

In one embodiment, the classification model may include a ResNet, a LeNet, or a logistic regression model.

In one embodiment, the sampled original dataset data comprise random samples from the original dataset, and the sampled distilled dataset data may include random samples from the distilled dataset.

In one embodiment, the distilled dataset cross-entropy loss may be based on the distilled dataset label for the distilled dataset data and the distilled dataset prediction probability.

In one embodiment, the fairness loss may be based on a demographic parity loss and/or an equalized odds loss.

In one embodiment, the original dataset total loss may include a sum of the original dataset cross-entropy loss, the demographic parity loss, and the equalized odds loss.

In one embodiment, the distilled dataset may be updated using a stochastic gradient descent using a gradient for the matching loss.

According to another embodiment, a non-transitory computer readable storage medium, including instructions stored thereon, which when read and executed by one or more computer processors, cause the one or more computer processors to perform steps comprising: receiving an original dataset and a sensitive attribute; initializing a distilled dataset from the original dataset; initializing a classification model; sampling original dataset data and an original dataset label from the original dataset, and distilled dataset data and a distilled dataset label from the distilled dataset; providing the sampled original dataset data from the original dataset to the classification model, resulting in an original dataset prediction probability; providing the sampled distilled dataset data from the distilled dataset to the classification model, resulting in a distilled dataset prediction probability; calculating a distilled dataset cross-entropy loss for the distilled dataset prediction probability and the distilled dataset label; calculating distilled dataset gradients for the distilled dataset cross-entropy loss; calculating a distance between the distilled dataset gradients and gradients for an original dataset total loss as a matching loss; and updating the distilled dataset with the matching loss.

In one embodiment, the non-transitory computer readable storage medium may also include instructions stored thereon, which when read and executed by one or more computer processors, cause the one or more computer processors to perform steps comprising: calculating an original dataset cross-entropy loss for the original dataset prediction probability and the original dataset label; calculating a fairness loss for the original dataset data between the distilled dataset prediction probability and the sensitive attribute; calculating an original dataset total loss by summing the original dataset cross-entropy loss and the fairness loss; and calculating original dataset gradients for the original dataset total loss.

In one embodiment, the non-transitory computer readable storage medium may also include instructions stored thereon, which when read and executed by one or more computer processors, cause the one or more computer processors to perform steps comprising: updating the classification model with the distilled dataset cross-entropy loss.

In one embodiment, the non-transitory computer readable storage medium may also include stored thereon, which when read and executed by one or more computer processors, cause the one or more computer processors to perform steps comprising: recalculating a distilled dataset cross-entropy loss before updating the classification model with the distilled dataset cross-entropy loss.

In one embodiment, the classification model may include a ResNet, a LeNet, or a logistic regression model.

In one embodiment, the sampled original dataset data comprise random samples from the original dataset, and the sampled distilled dataset data may include random samples from the distilled dataset.

In one embodiment, the distilled dataset cross-entropy loss may be based on the distilled dataset label for the distilled dataset data and the distilled dataset prediction probability.

In one embodiment, the fairness loss may be based on a demographic parity loss and/or an equalized odds loss.

In one embodiment, the original dataset total loss may include a sum of the original dataset cross-entropy loss, the demographic parity loss, and the equalized odds loss.

In one embodiment, the distilled dataset may be updated using a stochastic gradient descent using a gradient for the matching loss.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for fairness-aware data distillation for attribute classification.

Because, using standard dataset distillation, a distilled dataset will inherit the bias in the original dataset, resulting in an unfair machine learning model, embodiments may mitigate the unfairness during the distillation processing to generate a distilled dataset that can be used to train a fair machine learning model. For example, embodiments may use demographic parity (DP) and equalized odds (EO) processes in the distillation process. Thus, if the machine learning model satisfies demographic parity, samples in both privileged and unprivileged groups have the same probability to be predicted as positive.

Privileged groups may be considered as groups that are defined by one or more sensitive variables that are disproportionately more likely to be positively classified, whereas unprivileged groups are those groups that are disproportionately less likely to be positively classified. Examples of privileged groups and unprivileged groups are disclosed in Caton et al., "Fairness in Machine Learning: A Survey" (2020), available at arxiv.org/abs/2010.04053v1, the disclosure of which is hereby incorporated, by reference, in its entirety.

Equalized odds may be defined as a positive output that is statistically independent to the protected attribute (privileged or unprivileged) given the target label.

Figure 1:
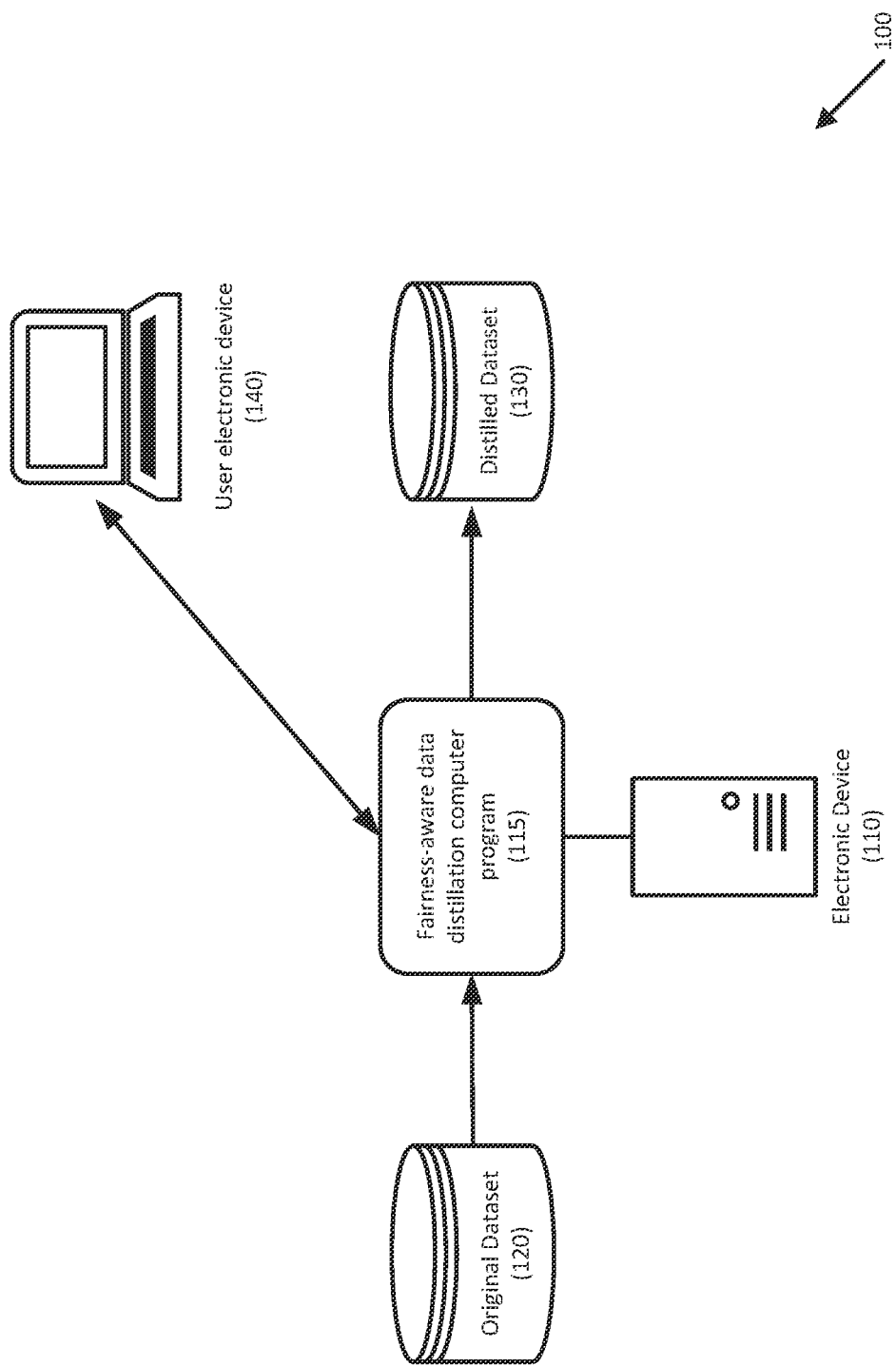
FIG. 1 illustrates a system for fairness-aware data distillation for attribute classification according to an embodiment.

Referring to FIG. 1, a system for fairness-aware data distillation for attribute classification is disclosed according to an embodiment. System 100 may include electronic device 110, which may be a server (e.g., physical and/or cloud-based), computers (e.g., workstations, desktops, laptops, notebooks, tablets, etc.), smart devices, Internet of Things (IoT) appliances, etc. Electronic device 110 may execute fairness-aware data distillation computer program 115, which may receive data from original dataset 120 and may generate distilled dataset 130.

User electronic device 140 may provide parameters, including an identification of a sensitive attribute, an identification of a target attribute, etc. to fairness-aware data distillation computer program 115.

Figure 2A:
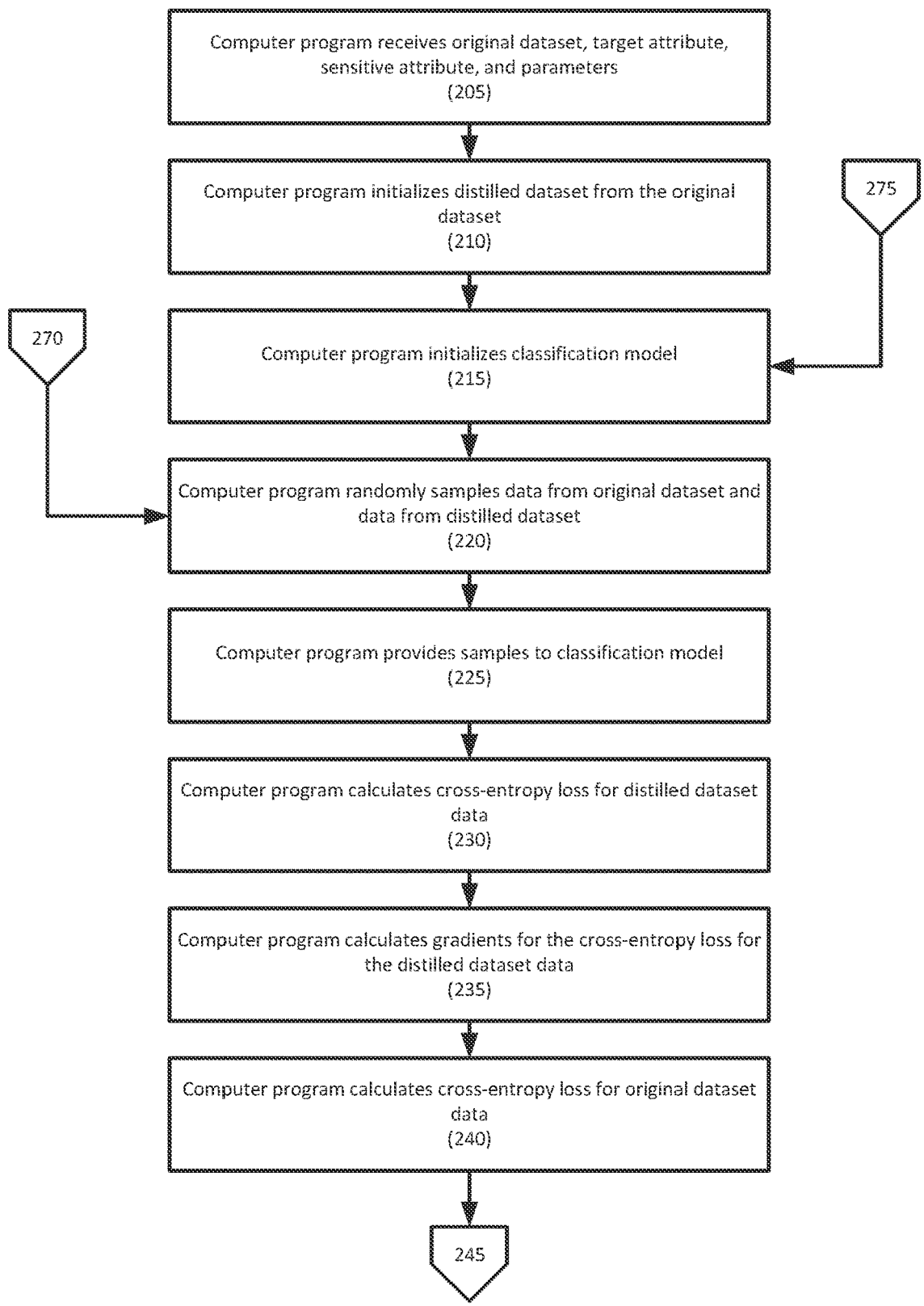
FIGS. 2A and 2B illustrate a method for fairness-aware data distillation for attribute classification according to an embodiment.
Figure 2B:
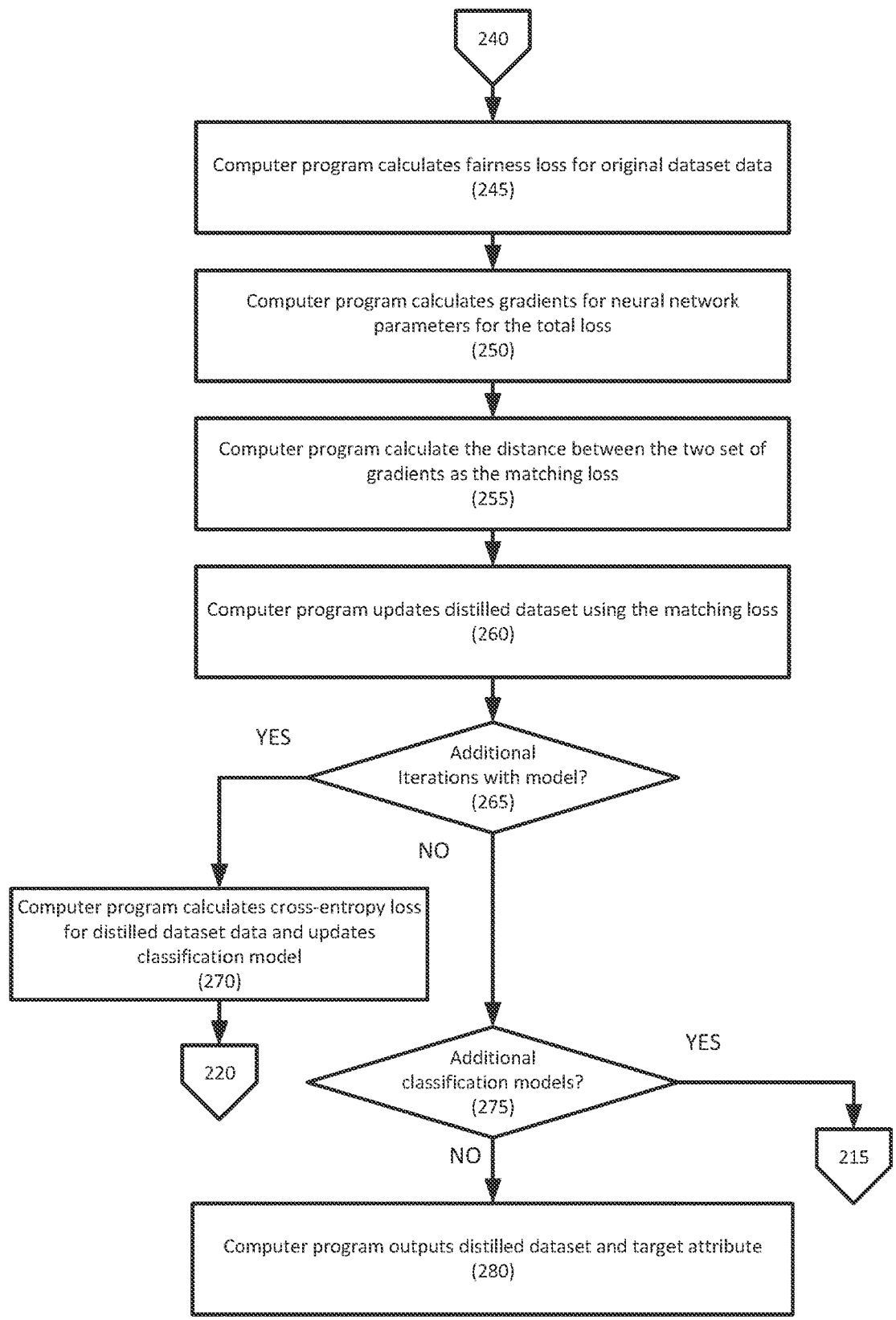

Referring to FIGS. 2A and 2B, a method for fairness-aware data distillation for attribute classification is disclosed according to an embodiment.

In step 205, a computer program, such as a fairness-aware data distillation computer program, may receive an original dataset, a target attribute, a sensitive attribute, and parameters. For example, the original dataset may be a large scale dataset with target attributes and sensitive attributes, and a set of parameters for fairness-aware dataset distillation process.

In the context of image processing, an example of a sensitive attribute is gender. Examples of target attributes may include hair color, a facial expression (e.g., smiling), etc.

Examples of parameter may include a size of the distilled dataset, a parameter to control the regularization strength of the DP fairness loss term, $\lambda_0$, a parameter to control the regularization strength of the EO fairness loss term, $\lambda_1$, a parameter to control the number of times for training with the same randomly initialized classification model, a parameter to control the number of randomly initialized classification models are trained with the distilled dataset, etc.

In step 210, the computer program may initialize a distilled dataset from the original dataset. For example, the computer program may sample the real large-scale dataset, or may randomly initialize and initiate its target attribute accordingly.

In one embodiment, the same number of instances for each target label from the original dataset may be sampled. For example, embodiments may sample the same number of smiling images from a pool of smiling data in the original dataset as from a pool of not smiling data in the original dataset.

In step 215, the computer program may initialize a classification model. For example, the computer program may randomly select a classification model. Examples of classification models may include neural networks, neural networks with different architectures (e.g., having different numbers of layers, different layers (e.g., ResNet, LeNet, etc.), logistic regression models that allow for gradient update, etc.

In step 220, the computer program may randomly sample data from the original dataset and data (e.g., individual faces) from the distilled dataset. The data may be sampled along with their labels.

In step 225, the computer program may provide the sampled data from the original dataset and the sampled data from the distilled dataset to the classification model. The classification model may return its prediction probability on the distilled data $p_R$ and its prediction probability on the original data $p_D$.

In step 230, the computer program may calculate a cross-entropy loss based on the distilled data $p_R$ and the label for the distilled data.

In general, the cross-entropy loss measures the performance of the classification model. Cross-entropy loss increases as the predicted probability diverges from the actual label.

In step 235, the computer program may calculate a set of gradients for neural network parameters based on cross-entropy loss calculated in step 230.

In step 240, the computer program may calculate a cross-entropy loss for the original data between $p_R$ and the label for the original data.

In step 245, the computer program may calculate a fairness loss for the original data using a fairness loss between $p_R$ and the sensitive attribute using a fairness loss term. The fairness loss may be a demographic parity loss and/or equalized odds loss. For example, to optimize for demographic parity, the fairness loss term may be:

$$\lambda_0 \Delta DP(f(x),s) = \lambda_0 | E_{x \sim P_\oplus} f(x) - E_{x \sim P_1} f(x) |.$$

During the optimization, the loss term may be minimized towards the smaller value, which means that either DP or EO with respect to the sensitive attribute will become smaller after the optimization. The calculation in the loss is proportion to the final evaluation metrics in DP and EO.

To optimize for equalized odds, the fairness loss term may be:

$$\lambda_1 \Delta EO(f(x), s, y) = \lambda_1 \sum_{y \in \{0,1\}} \left| E_{x \sim P_0^y} f(x) - E_{x \sim P_1^y} f(x) \right|$$

where $\lambda_0$ and $\lambda_1$ are the weights to control the regularization strength of the loss terms, which may be received as input parameters from the user.

In step 250, the computer program may calculate a total loss based on a sum of the cross-entropy loss from step 240 and the fairness loss (EO and DP losses) from step 245. The computer program may use the following equation:

$$E_{(x,y) \sim P}[\ell(f(x), y)] + \lambda_0 \left| E_{x \sim P_0} \int (x) - E_{x \sim P_1} \int (x) \right| + \lambda_1 \sum_{y \in \{0,1\}} \left| E_{x \sim P_0^y} f(x) - E_{x \sim P_i^y} f(x) \right|$$

It may then calculate a set of gradients for neural network parameters for the original dataset based on the total loss.

In step 255, the computer program may calculate the distance between the two set of gradients as the matching loss.

In step 260, the computer program may update the distilled dataset with the gradients from step 255.

In one embodiment, the distilled dataset may be updated and optimized with an optimizer (e.g., stochastic gradient descent, Adam (see Kingma, Diederik & Ba, Jimmy "Adam: A Method for Stochastic Optimization," International Conference on Learning Representations (2014), the disclosure of which is hereby incorporated by reference in its entirety) with the matching loss gradient.

In step 265, if there are additional iterations to run with the current classification model, in step 270, the computer program may calculate the cross-entropy loss for the distilled dataset data and may update the classification model, and then the process may return to step 220.

In one embodiment, the computer program may re-calculate the cross-entropy loss for the distilled dataset data; in another embodiment, the computer program may use the already calculated cross-entropy loss for the distilled dataset data.

For example, the classification model may be trained for several iterations with the updated distilled dataset, the target attribute, and the cross-entropy loss.

If there are no additional iterations, in step 275, a check may be made to see if there are additional classification models. If there are, the process may return to step 215 and may randomly initialize a new classification model.

If there are no further classification models, in step 280, the computer program may output the distilled dataset and the target attribute.

Figure 3:
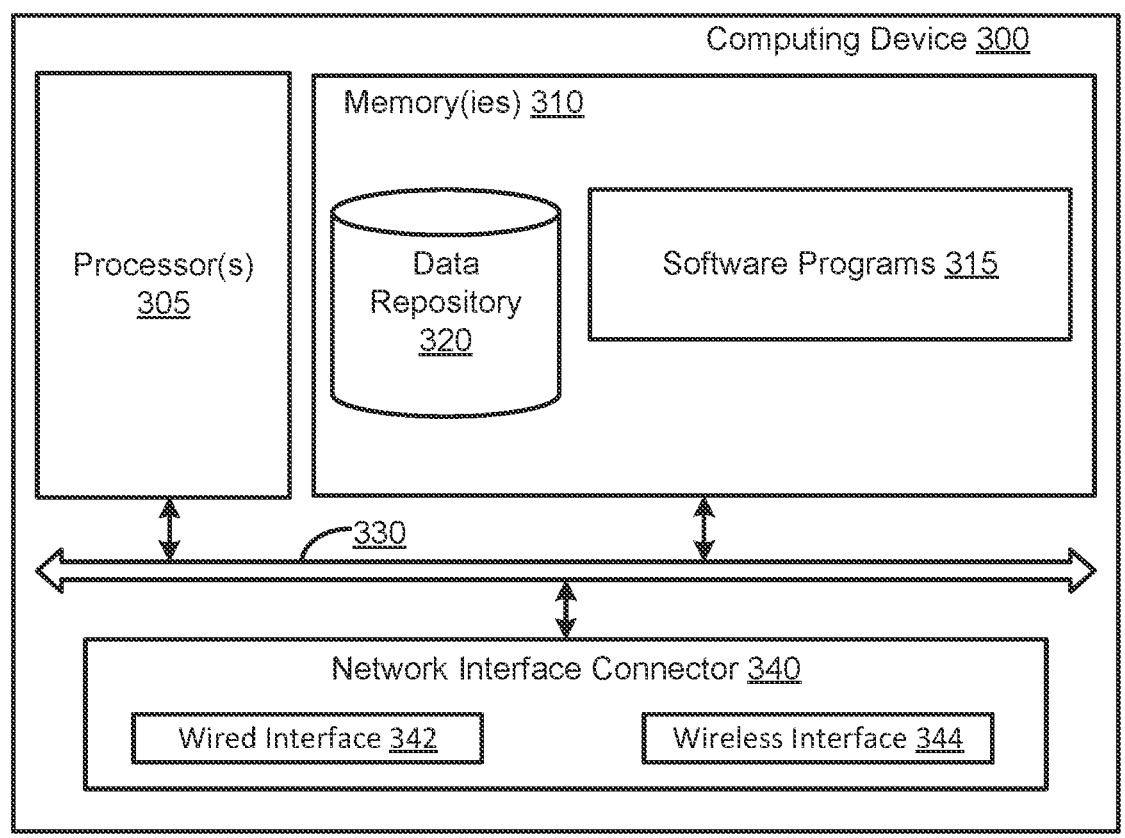
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for fairness-aware data distillation for attribute classification, comprising:
   receiving, by a fairness-aware data distillation computer program executed by a computer processor, an original dataset and a sensitive attribute;
   initializing, by the fairness-aware data distillation computer program, a distilled dataset from the original dataset;
   initializing, by the fairness-aware data distillation computer program, a classification model executed by the computer processor;
   sampling, by the fairness-aware data distillation computer program, original dataset data and an original dataset label from the original dataset, and distilled dataset data and a distilled dataset label from the distilled dataset;
   providing, by the fairness-aware data distillation computer program, the sampled original dataset data from the original dataset to the classification model, resulting in an original dataset prediction probability that is received from the classification model;
   providing, by the fairness-aware data distillation computer program, the sampled distilled dataset data from the distilled dataset to the classification model, resulting in a distilled dataset prediction probability that is received from the classification model;
   calculating, by the fairness-aware data distillation computer program, a distilled dataset cross-entropy loss for the distilled dataset prediction probability and the distilled dataset label;
   calculating, by the fairness-aware data distillation computer program, distilled dataset gradients for the distilled dataset cross-entropy loss;
   calculating, by the fairness-aware data distillation computer program, a distance between the distilled dataset gradients and gradients for an original dataset total loss as a matching loss; and
   updating, by the fairness-aware data distillation computer program, the distilled dataset with the matching loss for training the classification model to output a result.

2. The method of claim 1, further comprising:
   calculating, by the fairness-aware data distillation computer program, an original dataset cross-entropy loss for the original dataset prediction probability and the original dataset label;
   calculating, by the fairness-aware data distillation computer program, a fairness loss for the original dataset data between the distilled dataset prediction probability and the sensitive attribute;
   calculating, by the fairness-aware data distillation computer program, the original dataset total loss by summing the original dataset cross-entropy loss and the fairness loss; and
   calculating, by the fairness-aware data distillation computer program, original dataset gradients for the original dataset total loss.

3. The method of claim 2, wherein the fairness loss is based on a demographic parity loss and/or an equalized odds loss.

4. The method of claim 3, wherein the original dataset total loss comprises a sum of the original dataset cross-entropy loss, the demographic parity loss, and the equalized odds loss.

5. The method of claim 1, further comprising:
   updating, by the fairness-aware data distillation computer program, the classification model with the distilled dataset cross-entropy loss.

6. The method of claim 5, further comprising:
   recalculating, by the fairness-aware data distillation computer program, a distilled dataset cross-entropy loss before updating the classification model with the distilled dataset cross-entropy loss.

7. The method of claim 1, wherein the classification model comprises a ResNet, a LeNet, or a logistic regression model.

8. The method of claim 1, wherein the sampled original dataset data comprise random samples from the original dataset, and the sampled distilled dataset data comprises random samples from the distilled dataset.

9. The method of claim 1, wherein the distilled dataset cross-entropy loss is based on the distilled dataset label for the distilled dataset data and the distilled dataset prediction probability.

10. The method of claim 1, wherein the distilled dataset is updated using a stochastic gradient descent using a gradient for the matching loss.

11. A non-transitory computer readable storage medium including instructions, which when read and executed by one or more computer processors, cause the one or more computer processors to perform steps comprising:
   receiving, by a fairness-aware data distillation computer program, an original dataset and a sensitive attribute;
   initializing, by the fairness-aware data distillation computer program, a distilled dataset from the original dataset;
   initializing, by the fairness-aware data distillation computer program, a classification model;
   sampling, by the fairness-aware data distillation computer program, original dataset data and an original dataset label from the original dataset, and distilled dataset data and a distilled dataset label from the distilled dataset;
   providing the sampled original dataset data from the original dataset to the classification model, resulting in an original dataset prediction probability that is received from the classification model;
   providing the sampled distilled dataset data from the distilled dataset to the classification model, resulting in distilled dataset prediction probability that is received from the classification model;
   calculating, by the fairness-aware data distillation computer program, a distilled dataset cross-entropy loss for the distilled dataset prediction probability and the distilled dataset label;
   calculating, by the fairness-aware data distillation computer program, distilled dataset gradients for the distilled dataset cross-entropy loss;
   calculating, by the fairness-aware data distillation computer program, a distance between the distilled dataset gradients and gradients for an original dataset total loss as a matching loss; and
   updating, by the fairness-aware data distillation computer program, the distilled dataset with the matching loss for training the classification model to output a result.

12. The non-transitory computer readable storage medium of claim 11, further including instructions, which when read and executed by one or more computer processors, cause the one or more computer processors to perform steps comprising:
   calculating an original dataset cross-entropy loss for the original dataset prediction probability and the original dataset label;
   calculating a fairness loss for the original dataset data between the distilled dataset prediction probability and the sensitive attribute;
   calculating the original dataset total loss by summing the original dataset cross-entropy loss and the fairness loss; and
   calculating original dataset gradients for the original dataset total loss.

13. The non-transitory computer readable storage medium of claim 12, wherein the fairness loss is based on a demographic parity loss and/or an equalized odds loss.

14. The non-transitory computer readable storage medium of claim 13, wherein the original dataset total loss comprises a sum of the original dataset cross-entropy loss, the demographic parity loss, and the equalized odds loss.

15. The non-transitory computer readable storage medium of claim 11, further including instructions, which when read and executed by one or more computer processors, cause the one or more computer processors to perform steps comprising:
   updating the classification model with the distilled dataset cross-entropy loss.

16. The non-transitory computer readable storage medium of claim 15, further including instructions, which when read and executed by one or more computer processors, cause the one or more computer processors to perform steps comprising:
   recalculating a distilled dataset cross-entropy loss before updating the classification model with the distilled dataset cross-entropy loss.

17. The non-transitory computer readable storage medium of claim 11, wherein the classification model comprises a ResNet, a LeNet, or a logistic regression model.

18. The non-transitory computer readable storage medium of claim 11, wherein the sampled original dataset data comprise random samples from the original dataset, and the sampled distilled dataset data comprises random samples from the distilled dataset.

19. The non-transitory computer readable storage medium of claim 11, wherein the distilled dataset cross-entropy loss is based on the distilled dataset label for the distilled dataset data and the distilled dataset prediction probability.

20. The non-transitory computer readable storage medium of claim 11, wherein the distilled dataset is updated using a stochastic gradient descent using a gradient for the matching loss.

* * * * *